July 28, 1931.　　　M. JOACHIMSON　　　1,816,535
DEVICE FOR SPREADING BUTTER
Filed June 16, 1927　　2 Sheets-Sheet 1
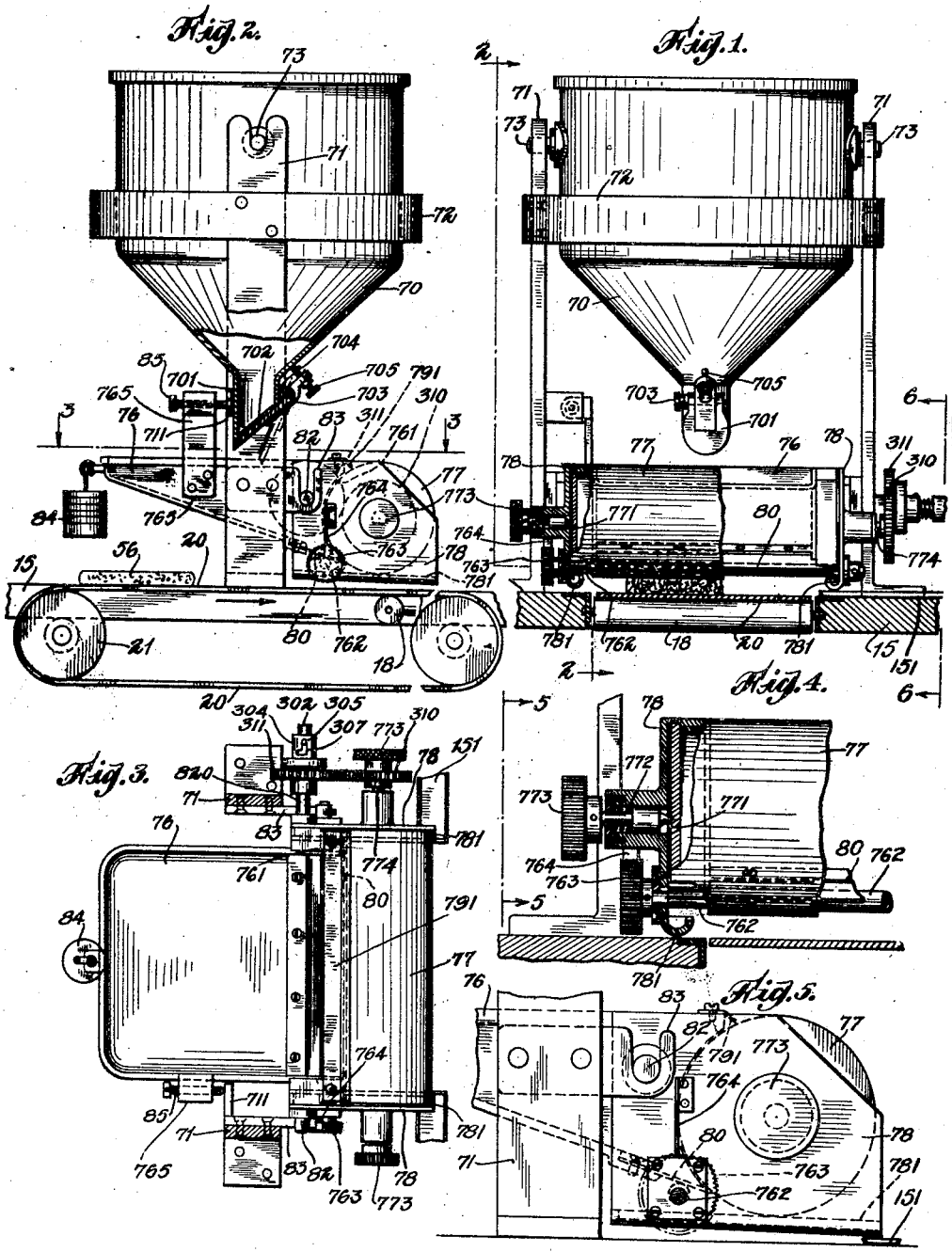
Inventor
Martin Joachimson
By his Attorney
Walter E. Wollheim

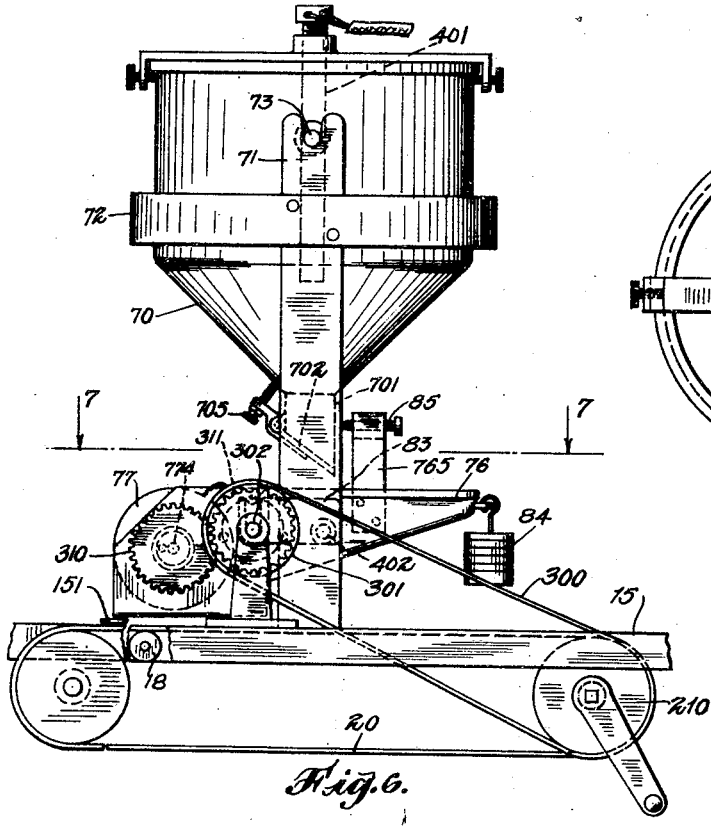

Patented July 28, 1931

1,816,535

UNITED STATES PATENT OFFICE

MARTIN JOACHIMSON, OF NEW YORK, N. Y.

DEVICE FOR SPREADING BUTTER

Application filed June 16, 1927. Serial No. 199,268.

This invention relates to devices for spreading butter, jam or similar substances upon bread slices or the like. It is the object of the invention to apply butter rapidly and evenly upon such slices. It is a further object of this invention to provide means for varying the thickness of the butter film, applying the butter economically without any appreciable loss.

It is another object of the invention to provide means for an equal distribution of butter upon bread slices having non-parallel surfaces.

With these and other objects in view which will become more apparent as the description progresses, the invention consists in a novel combination of parts and details of construction hereinafter described and illustrated in the accompanying drawings which form a material part of this disclosure and as finally pointed out in the appended claims.

In the drawings:

Fig. 1 is a front elevation of a buttering device embodying the invention in which the supporting table and conveyor belt are shown in section, parts of roller 77 and one knob 773 are removed to show the interior of container 76 and the power drive.

Fig. 2 is a side elevation of Fig. 1 on line 2—2 of that figure.

Fig. 3 is a plan view on line 3—3 of Fig. 2.

Fig. 4 is an enlarged front elevation showing the mounting of roller 77 and knife 80.

Fig. 5 is a side elevation of Fig. 4 seen in the direction of arrows 5—5 at Fig. 4.

Fig. 6 is a side elevation on line 6—6 of Fig. 1 showing the power driving means for the buttering device.

Fig. 7 is a plan on line 7—7 of Fig. 6 showing the power driving means.

Fig. 8 is a top-plan of butter storage container 70 showing mounting of heating device.

Fig. 9 is a wiring diagram of heating element 401 and thermostatic switch 402.

This butter spreading device is mounted upon a suitable table 15 provided with a wide longitudinal slot which accommodates an endless conveyor belt 20 supported at intervals upon idler rollers 18 and driven by means of a friction pulley 21 either by hand or by suitable power means. This belt and its driving means are more fully illustrated in my co-pending application for Letters Patent for a "machine for making sandwiches," Serial No. 199,269 filed June 16, 1927, of which this butter spreading device forms an important part. Upon table 15 to either side of belt 20 a vertical post 71 is provided. These posts are joined to each other by a ring or hoop 72 and their upper ends have vertical slots in which trunnions 73 of a butter storage vessel 70 are carried. The lower part of this storage vessel has the shape of a funnel with delivery spout 701 which is cut off under an angle. The angular opening is covered by a lid 702 which is mounted to swing about a hinge-pin 703 held on a bracket 704 on the outside of spout 701. Lid 702 has an upward extension beyond hinge pin 703 with a threaded aperture occupied by adjusting screw 705. The point of this screw presses against the conical surface of storage vessel 70. As screw 705 is loosened the lid 702 opens by gravity. To lower part of posts 71 hook-shaped brackets 83 are attached, these hold trunnions 82 and 820 of a butter container or fountain 76 which is rectangular in plan and has the width of belt 20. The bottom of container 76 is slanted towards the front side which is formed by roller 77. This roller is longer than the width of the container or belt 20. The container casing is widened to accommodate the roller between the side plates 78 and the transverse front faces of the casing are curved to fit the roller closely at 761. The front edge of the slanted bottom of the container 76 is provided with a knife blade 80 which extends along the full length of the roller 77 between side plates 78. Below this knife a transverse shaft 762 is arranged which is journalled in bearings on side plates 78. Shaft 762 is provided with an eccentric portion located between side plates 78. Knife 80 which is preferably made of resilient sheet metal leans with its lower face against shaft 762. A knob 763 grooved on its cylindrical surface and provided with a dial on its front face serves to turn this shaft and the eccentric portion on shaft 762. When knob 763 is rotated it lifts knife 80 gradually towards the roller until the front edge of the knife leans against roller 77. An indicating spring 764 which engages the grooves of knob 763 indicates the size of opening between knife 80 and roller 77 and consequently the thickness of butter-film applied thereto. Roller 77 is journalled on centers 771 and 774 held by side plates 78. These centers may be withdrawn against springs 772 by pulling knobs 773 outward, so that the roller can be quickly removed for cleaning the container. Side-plates 78 have a curved gutter 781 at their lower edge to lead away from the fountain drippings of butter which may leak through between the roller ends and side plates 78. Further gutters 151 are arranged transversely upon table 15 to collect the drippings from gutters 781 and to lead them to collecting vessels at the sides of table 15. On one side of container 76 an upward extension 765 is provided which holds a horizontal adjusting screw 85, the point of which leans against a stop 711 on standard 71. (See Fig. 2.)

Above roller 77 parallel to its axis and between side plates 78 is mounted a scraper blade 791 which is bent downward in radial direction of the roller to a line above the butter film on the roller. It is the purpose of this blade to prevent bread crumbs, to be carried into the butter of container 76. Such crumbs are sometimes separated from the last buttered slice and are carried by the roller.

The rear plate of container 76 carries a weight 84 which may be varied by addition or removal of thin washers held thereon. The butter spreading device is preferably placed on table 15 in such a position that an idler roller 18 below belt 20 is a short distance ahead of fountain roller 77.

The roller 77 is driven to rotate at the same speed as belt 20 (see Figs. 6 and 7) by means of a narrow belt 300 running on a pulley 210 of the same diameter as pulley 21. Belt 300 drives a pulley 301 above table 15 arranged on shaft 302 and bearings 303, of the same diameter as roller 77. Shaft 302 is arranged in axial alinement with trunnions 82 and 820 of the container 76. It carries a clutch block 304 slidably held thereon by a guide pin 305 which forms means to rotate the clutch and to lock it. Between block 304 and the adjacent bearing 303 a helical spring 306 is interposed which presses the block away from the bearing. Block 304 carries at its front end a pin 308 which enters an aperture of a gear 311 mounted loosely upon pivot 820 of container 76. Pin 308 may be disengaged from gear 311 by sliding block 304 backward and pressing it against spring 306. It may be locked in this position by turning block 304 slightly, which brings pin 305 into the angular part of slot 307. Gear 311 meshes into a gear 310 of equal diameter mounted upon the roller-center 774. Next to this center-forming point a pin 775 is provided which enters a corresponding aperture of roller 77 for rotating the roller. In this manner the roller can be rotated continuously on its axis and it may simultaneously oscillate about trunnions 82 and 820. The power drive may be disengaged from the butter spreading device by means of clutch block 304.

To hold the butter at a uniform consistency its temperature is regulated by means of an electric heating device 401 inserted into one of the butter containers, preferably the upper one. This heater consists of a resistance enclosed in a closed tube; its current may be switched on or off by hand by a switch 403 or preferably by a thermostat switch 402 which is inserted either in the same or in the other butter container 76, the latter method is shown in the drawings. Thermostatic switches for this purpose consist preferably of a flat blade or reed of two metals having different coefficients of expansion and close or open a circuit by their bending under heat action, the thermostatic element is enclosed in a tube similar to that of the heating element.

The reliable operation of this butter spreading device is obtained as follows:—

Container 70 and storage vessel 76 are filled with butter having a temperature of about 80 deg. F. The weight 84 at the rear end of container 70 is then so adjusted that the front and rear parts of the fountain are balanced about the pivots 82 and 820. A slice of bread 56 of the thickness of those to be buttered is placed below roller 77 and screw 85 is adjusted so that its point leans against stop 711 without lifting roller 77 from the bread slice. As this screw is arranged above pivots 82 its tightening lifts this roller gradually. The knife 80 is then adjusted away from roller 77 by turning knob 763 to permit the roller to be covered with a film of butter when turned. Spring 764 holds eccentric shaft 761 against accidental rotation and serves as an index finger for the thickness of butter film on roller 77 in connection with the dial on knob 763.

Belt 20 is then set in motion in the direction of the arrow of Fig. 2 either by hand or by suitable mechanical means, and slices of bread placed thereon in short intervals. When the front edge of a bread slice reaches the lowest line of roller 77 it starts to lift the same by the slight pressure resulting from the power applied to the roller and required for overcoming the friction of butter in the container against the roller.

Inequality in thickness of the bread slice transversely is equalized by the resiliency of the belt 20. But in addition hereto either one of the trunnions 820 may be lifted slightly in the slot of bracket 83 and the roller thereby assumes a slightly inclined position. As the bread slice travels a short distance forward its front edge comes above the solid support of idler roller 18 which increases the pressure of the slice 56 against roller 77 and assures that the roller is wiped clean of butter by the bread slice.

Escape of butter towards and at the end plates 78 is prevented by capillary attraction as the end portions of the roller between the narrower part of container 76 and end plates 78 fit the roller so closely that the butter cannot escape. As butter is dispensed, from fountain 76 the balance of the latter would be disturbed and the pressure of the roller 77 against the bread slices would be increased. To prevent this, and to keep the fountain constantly filled to the same level, the storage vessel 70 is provided and its lid 702 may be so adjusted that it supplies just as much butter to the container 76 as is dispensed therefrom by roller 77.

To clean the device the power drive is first disconnected from the device by pushing clutch block 304 to the rear and giving it a slight turn to lock it. The storage vessel 70 is then removed by lifting its pivots 73 out of the slots in the upper ends of standards 71. The container can then be lifted up so that its pivots 82 become free of brackets 83 and adjusting screw 85 from stop 711, whereupon the container 76 can be moved out of its place in forward direction. The roller 77 can be removed as previously described by pulling knobs 773 and gear 311 outwardly and the whole apparatus may be washed in an alkaline bath and rinsed, to remove all traces of butter.

The facility of operating and cleaning this device is one of its principal advantages. It may be continuously operated for many hours as more than one storage container can be employed, one being filled while another one is in operation.

The economy in butter consumed is another advantage as all butter not applied to the bread slices is returned to the container, and as there is practically no leakage although precautions are included in the design that no leakage can reach the belt.

Having thus described my invention what I claim as new and desire to secure by Letters Patent is:

1. In a device of the kind described, a container for holding spreadable material, a roller mounted to rotate within the material held in said container, a support for bread slices arranged to hold the slices against said roller and means for operating said roller and said support continuously, said container being mounted to bring said roller to bear upon the slices on said support by the gravity of said container and roller.

2. In a device of the kind described a container for holding butter, a roller mounted in said container to remove butter therefrom, a support for holding bread slices disposed below said roller and means to move said support and to rotate said roller continuously, means to vary the distance between said roller and said support and other means to adjust the pressure of said roller against bread slices lying on said support.

3. In a butter spreading device, a butter holding container, a cylinder rotatably mounted thereon, closing one side of said container and being constantly immersed in the butter therein, pivots on said container for mounting said cylinder to oscillate about an axis parallel to its own axis and means to adjust and to limit the oscillatory movement.

4. In a butter spreading device a support, a carrier movably mounted thereon, a frame above said carrier, a butter dispensing container pivotally mounted on said frame in stationary position, a cylinder rotatably held on said container and constantly immersed in the butter therein, forming means to cover said roller with butter, yielding means to vary the thickness of butter on said roller and means to adjust the distance between said roller and said carrier.

5. In a device of the kind described a support for carrying bread slices, a butter container, a roller mounted within said container to receive butter therefrom, means mounting said container yieldingly above said support and means to rotate said roller continuously for constantly applying butter thereto to butter slices on said support.

6. In a device for spreading butter on bread slices, a container for holding butter, a roller mounted in said container to receive butter therefrom, a flexible support mounted to hold bread slices yieldingly against said roller, means to rotate said roller and to move said support and means to adjust said container for buttering bread slices of varying thickness.

7. In a device for applying butter a butter container mounted to swing on a horizontal axis at one side thereof, a distributing roller mounted in said container at the opposite side of said axis and to be constantly and uniformly supplied with butter from said container, said roller being substantially counterbalanced on said axis by said container and its contents.

8. In a device for spreading butter on bread slices a container mounted to oscillate on a horizontal axis located at one side thereof, a distributing roller mounted in said container at the opposite side of said axis, adapting said container to balance said roller on said axis, and means for rotating said roller continuously.

9. In a buttering device a distributing roller, a container, in which said roller is mounted at one side thereof pivots on said container mounting it and said roller in a frame to oscillate about a common axis provided by said pivots, a butter storage vessel mounted to discharge butter into said container and means on said vessel to adjust the flow of butter therefrom into said container to maintain a constantly equal quantity of butter in said container for equally counterbalancing said roller and said container on said axis.

10. In a device of the kind described a support, a container for spreading material, a spreading roller mounted therein, pivots holding said container in a frame a fixed distance above said support and permitting said spreading means to yield towards and away from said support and means to rotate said roller continuously.

11. In a device of the kind described a support, a container, a spreading roller in said container discharging liquid therefrom, means mounting said container and roller yieldingly above said support, means to transmit rotary motion to said roller and adjustable means to discharge a variable stream of liquid into said container to keep the weight and position of said container unaltered.

12. In a device of the kind described a container for spreadable material, a roller mounted on pivot pins fixed in opposite side walls of said container, one of said pivot pins being longitudinally movable a limited distance to be withdrawn from said roller, a pair of gears on said container to rotate said roller, one of said gears being mounted on said pivot pin to be movable therewith and to control rotation thereby.

In testimony whereof, I, MARTIN JOACHIMSON, have signed my name to this specification this 14th day of June 1927.

MARTIN JOACHIMSON.